(12) United States Patent
Magnet et al.

(10) Patent No.: US 7,105,605 B2
(45) Date of Patent: Sep. 12, 2006

(54) POLYMER BINDER FOR INTUMESCENT COATINGS

(75) Inventors: Serge Magnet, Buc (FR); Sophie Duquesne, Saint Andre (FR); René Delobel, Villeneuve d'Ascq (FR); Charaf Jama, Villeneuve d'Ascq (FR)

(73) Assignee: Eliokem S.A.S., Villejust (FR)

( * ) Notice: Subject to any disclaimer, the term of this patent is extended or adjusted under 35 U.S.C. 154(b) by 222 days.

(21) Appl. No.: 10/742,536

(22) Filed: Dec. 19, 2003

(65) Prior Publication Data

US 2004/0132910 A1    Jul. 8, 2004

(30) Foreign Application Priority Data

Dec. 20, 2002   (EP)   .................................. 02293183

(51) Int. Cl.
*C08L 25/16* (2006.01)
*C08L 33/08* (2006.01)
*C08L 35/02* (2006.01)

(52) U.S. Cl. ........................... 525/222; 525/241

(58) Field of Classification Search ............... 525/222, 525/241

See application file for complete search history.

(56) References Cited

U.S. PATENT DOCUMENTS 4,794,139 A * 12/1988 Braden et al. ............... 524/117
5,456,875 A * 10/1995 Lambert ................... 264/328.1

FOREIGN PATENT DOCUMENTS

EP          0 902 062 A    3/1999
WO      WO 01 05886 A     1/2001

* cited by examiner

*Primary Examiner*—Nathan M. Nutter
(74) *Attorney, Agent, or Firm*—Alvin T. Rockhill

(57) ABSTRACT

The present invention discloses a copolymer composition for use in or as a polymeric binder in an intumescent coating, said copolymer composition comprising a blend of a Newtonian copolymer and of a reticulated copolymer, wherein the Newtonian copolymer is comprised of p-methylstyrene repeat units and 2-ethylhexylacrylate repeat units, and wherein the reticulated copolymer is comprised of p-methylstyrene repeat units and 2-ethylhexylacrylate repeat units. The present invention further reveals a method of manufacturing an intumescent coating comprising the step of (a) dissolving a Newtonian and a reticulated copolymer in a solvent, wherein the Newtonian copolymer is comprised of p-methylstyrene repeat units and 2-ethylhexylacrylate repeat units, wherein the reticulated copolymer is comprised of p-methylstyrene repeat units and 2-ethylhexylacrylate repeat units, and wherein the solvent is selected from the group consisting of organic solvents and water, (b) optionally, adding a chlorinated paraffin to the solvent, (c) homogenizing the mixture in the solvent, wherein one or more additives selected from the group consisting of conventional reactive pigments systems, dispersants, plasticizers, defoamers, thickeners, chlorinated paraffin solvents, waxes, fillers, fibers, and anti-settling agents are added to the solvent during the homogenizing step.

10 Claims, 8 Drawing Sheets

Thermal degradation curve of Newtonian PMS/2EHA resin, APP and of the 60/40 with mixtures of the two.

Thermal degradation curve of Newtonian styrene/acrylic resin, APP and of the 60/40 with mixtures of the two.

Thermal degradation curve of cross-linked PMS/2EHA resin, APP and of the 60/40 with mixtures of the two.

Thermal degradation curve of cross-linked styrene/acrylic resin, APP and of the 60/40 with mixtures of the two.

Δ(T) curves: difference between theoretical and experimental weight loss in TGA for 60/40 blends of various PMS/2EHA resins and APP Thermal insulation on aluminium plates with intumescent coatings prepared with PMS/2EHA and with styrene/acrylic resins Thermal insulation on aluminium plates obtained with intumescent coatings prepared with various types of resins RHR measured with intumescent coatings prepared with various types of resins and exposed at 35 kW/m²

POLYMER BINDER FOR INTUMESCENT COATINGS

TECHNICAL FIELD

The present invention relates to copolymers for use in or as polymeric binders for fire retardants coatings, more particularly intumescent coatings providing excellent fire proofing performance.

BACKGROUND OF THE INVENTION

Intumescent coating compositions are well-known in the art. An outstanding feature of intumescent coatings is that they may be applied on substrates, such as metal, wood, plastics, graphite and other materials, in the manner of a coating having relatively low film thickness. Upon exposure to fire, heat or flames, the intumescent coatings expand considerably in terms of thickness to produce an insulative layer of char and char foam.

The most commonly used intumescent coatings contain four basic components, sometimes called "reactive pigments", dispersed in a binder matrix. The reactive pigments include (1) an inorganic acid or a material which yields an acid at temperatures between 100° C. and 250° C., such as for example, ammonium polyphosphate which yields phosphoric acid; (2) a carbon source such as a polyhydric material rich in carbon, also referred to as a carbon hydrate, for example, pentaerythritol or dipentaerythritol; (3) an organic amine or amide, such as for example, a melamine; and optionally (4) a halogenated material which releases hydrochloric acid gas on decomposition.

The basic intumescent mechanism is proposed to involve the formation of a carbonaceous char by the dehydration reaction of the generated acid with the polyhydric material. The amine may participate in char formation, but is described primarily as a blowing agent for insulating char foam formation. Because the insulating char stops fire and remains on the substrate, it offers better fire and thermal protection under severe fire conditions than non-flammable type coatings.

Numerous patents and publications, have disclosed intumescent compositions containing one or more polymeric materials in combination with phosphate containing materials and carbonific or carbonic yielding materials.

In European Patent 0 902 062, the intumescent coating compositions can comprise vinyltoluene/acrylate copolymers or styrene/acrylate polymers as a film-forming binder.

In U.S. Pat. No. 3,654,190, the intumescent coating contains a solid vinyltoluene/butadiene copolymer associated to a chlorinated natural rubber acting as a char former.

In European Patent 0 342 001, polymeric binder for intumescent coatings comprise copolymers formed of a first monomer in a predominant amount and of a second monomer in a minor amount, said second monomer being a thermally labile co-monomer which is preferably a monomeric aledhyde such as acroleine.

In WO Patent 01/05886, a polymeric binder in an emulsion form is operative to form a film when the composition is allowed to dry. The polymeric binder described by WO Patent 01/05886 is a styrene/acrylate copolymer.

The coatings industry seeks fire retardant coatings which not only meet fire retardancy requirements, but which also possess desirable coating properties. The reactive pigments utilised in the formulation of an intumescent coating are not sufficient in and of themselves to provide desirable coating properties. For example, an intumescent coating must provide all the performance characteristics expected of a conventional coating plus the added benefit of fire retardancy. Incorporating both fire retardance and good coating properties in one system is not straightforward. The combinations of additives, such as, for formulating an intumescent coating can often result in a formulation possessing both poor coating and poor fire retardancy properties.

It was found that the chemical and physical properties of the binder are critical to the functioning of an intumescent coating. On one hand, the binder should not soften or melt too quickly to permit the formation of a stable char. On the other hand, the viscosity of the binder is correlated with the diffusion and the char formation.

It is therefore desired to provide a polymer binder for intumescent coatings which reduces flame spread during the early stages of a fire and which contributes to improve the char formation and intumescence during the latter stages of the fire.

SUMMARY OF THE INVENTION

It has been found that the combination of a linear polymer and a cross-linked polymer as a binder for intumescent coatings allows for the optimization of char formation and increases the insulating properties of the coatings. Moreover the inventors have discovered that the more the copolymer contains styrene, the more the interactions with the phosphorus are negative. On the contrary, the more the copolymer contains p-methylstyrene (PMS), the more the interactions with the phosphorus are positive, thus providing a good intumescence.

They have further discovered that the properties of the intumescent compositions according to the invention are correlated with the capacity of the copolymer to react with the phosphorus and to the presence of p-methylstyrene (PMS) and 2-ethylhexylacrylate (2EHA).

Accordingly, this invention provides a copolymer for the use in or as a polymeric binder in intumescent coatings, comprising a blend of a newtonian copolymer and of a reticulated copolymer, said newtonian and reticulated copolymers consisting of substituted styrene and substituted acrylate and comprising at least p-methylstyrene (PMS) and 2-ethylhexylacrylate (2EHA).

The invention also provides in another aspect an intumescent fire retardant coating containing the above polymeric binder and a method of forming such a coating.

The reticulated copolymers are chosen from the group comprising thixotropic copolymers and pseudo-plastic copolymers.

The present invention more specifically discloses a copolymer composition for use in or as a polymeric binder in an intumescent coating, said copolymer composition comprising a blend of a Newtonian copolymer and of a reticulated copolymer, wherein the Newtonian copolymer is comprised of p-methylstyrene repeat units and 2-ethylhexylacrylate repeat units, and wherein the reticulated copolymer is comprised of p-methylstyrene repeat units and 2-ethylhexylacrylate repeat units.

DETAILED DESCRIPTION OF THE INVENTION

Figure 1:
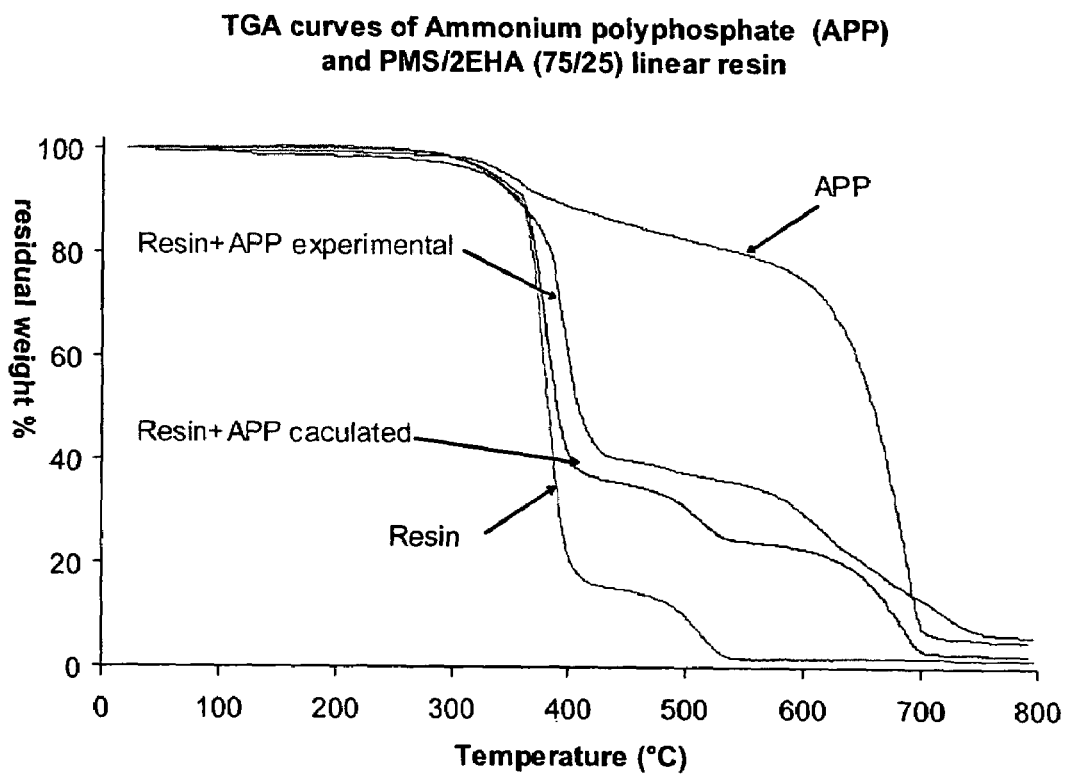
FIG. 1 shows the thermal stability of a Newtonian copolymer containing PMS/2EHA (75/25) alone, of ammonium polyphosphate (APP) alone, or of a 60/40 mixture of both (calculated and experimental values).

In the sense of the instant invention, newtonian copolymers refers to copolymers which give a newtonian viscosity profile when dissolved in a solvent, i.e. the viscosity is not shear dependent; thixotopic copolymers refers to copolymers giving a shear thining solvent solutions, returning to their original state upon standing with time dependency, pseudo-plastic copolymers are copolymers which give a shear thinning solution when dissolved in a solvent.

It was found that the ratio between PMS and 2EHA should be of from 100/0 to 50/50, preferably of 90/10, preferably of 80/20 and more preferably of 75/25.

The copolymers used as polymeric binders in accordance with this invention may further contain other substituted styrene monomers, such as p-tert-butylstyrene (PTBS) and/or other substituted acrylates, such as isobutylmethacrylate (IBMA).

The examples of suitable Newtonian copolymers include Pliolite VTAC-L, Pliolite VTAC-H, Plioway ECH, Plioway Ultra 200, Plioway EC1, all trademarks of ELIOKEM.

The examples of suitable reticulated copolymers include Pliolite AC3H, Plioway ECL, Plioway Ultra G20, Plioway EC-T, all trademarks of ELIOKEM.

The Newtonian and reticulated copolymers are prepared by polymerisation, said polymerisation being effected in a bulk, in a solution, in a suspension or in an emulsion. The best mode is by a conventional emulsion polymerisation.

The polymeric binder may then be formulated by conventional techniques, such as for example by mixing, with conventional reactive pigments systems, dispersants, plasticizers, defoamers, thickeners, chlorinated paraffin solvents and other additives conventionally employed to prepare the type of desired intumescent coatings (waxes, fillers, fibers, anti-settling agents and the like).

According to this invention, the best mode of forming said polymeric binder comprises the step of (a) dissolving the Newtonian and/or the reticulated copolymers in the solvent or in water, (b) optionally adding the chlorinated paraffin, (c) homogenizing the mixture and adding the additives.

The intumescent coatings according to the invention preferably contain as foam-forming substances ammonium salts of phosphoric acid and/or polyphosphoric acid, more preferably ammonium polyphosphate.

The intumescent coatings according to the invention preferably contain carbohydrides as carbon forming substances, preferably pentaerythritol, dipentaerythritol, tripentaerythritol and/or polycondensate of pentaerythritol.

The intumescent coatings according to the invention may contain a halogen or may be halogen free.

The intumescent coatings according to the invention are used in the form of a brushable, sprayable or rollable coating material for protecting different surfaces, preferably steel, wood, electric cables and pipes from heat and fire.

The intumescent coatings according to the invention may be water-based or solvent-based compositions.

The intumescent coatings according to the present invention may be employed in roofing applications to prevent ignition and the spread of flames, for application onto non-combustible substrates, such as structural steel as in buildings, girders, and the like, vessels, or storage tanks to protect them from weakening upon encountering very high temperatures in a fire.

The following examples and the figures are presented to illustrate the invention utilising intumescent coating formulations containing a binder according to the instant invention. The following examples are merely for the purpose of illustration and are not to be regarded as limiting the scope of the invention or the manner in which it can be practiced. Unless specifically indicated otherwise, parts and percentages are given by weight.

EXAMPLE 1

Thermal Stability of the Polymeric Binder 1.1. Measurements

The thermal stability of various compositions is measured by thermogravimetric analysis.

Thermogravimetric analyses (TGA) were carried out at 10° C./min under synthetic air or nitrogen (flow rate: 5×10$^{-7}$ m$^3$/s, Air Liquide grade) using a Setaram MTB 10-8 microbalance. In each case, the mass of the sample used was fixed at 10 mg and the samples (powder mixtures) were positioned in open vitreous silica pans. The precision of the temperature measurements was 1.5° C. over the whole range of temperatures. The curves of weight differences between the experimental and theoretical TGA curves are computed as follows:

$M_{poly}$(T): TGA curve of copolymers
$M_{add}$(T): TGA curve of APP,
$M_{exp}$(T): TGA curve of copolymer/APP,
$M_{the}$(T): TGA curve computed by linear combination between the TGA curves of copolymer and APP,
$M_{the}$(T): x $M_{poly}$(T)+y $M_{APP}$(T),
(T): curve of weight difference:
(T)=$M_{exp}$(T)−$M_{the}$(T).

The (T) curve enables the observation of an eventual increase or decrease in the thermal stability of the polymer related to the presence of the additive.

1.2. Results

The TGA curves are illustrated in FIGS. 1 to 5.

Figure 2:
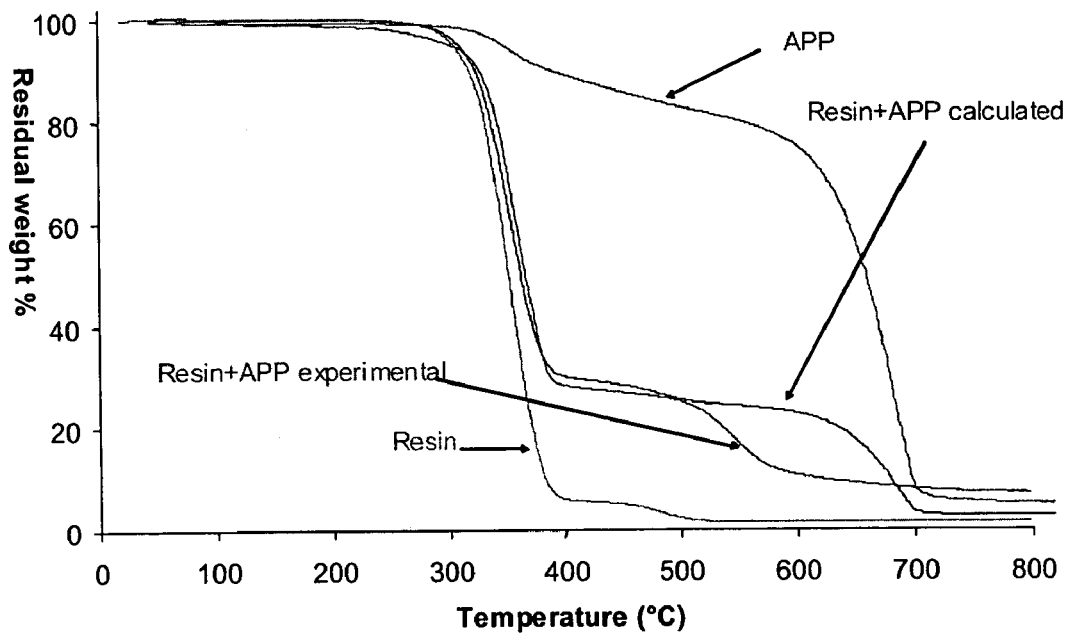
FIG. 2 shows the thermal stability of a Newtonian copolymer containing a styrene/acrylic copolymer alone, of ammonium polyphosphate (APP) alone, or of a 60/40 mixture of both (calculated and experimental values).

An increase of the thermal stability is obtained with the PMS/2EHA copolymer (FIG. 1) when compared with the styrene/acrylic (S/A) copolymer (FIG. 2).

Figure 3:
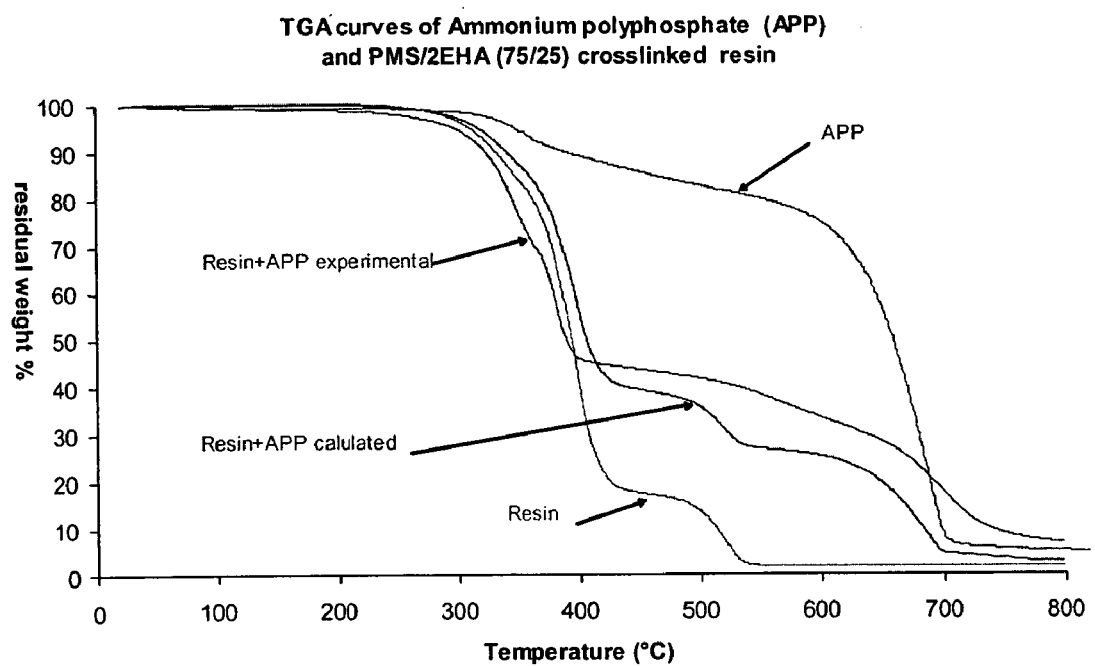
FIG. 3 shows the thermal stability of a copolymer containing a cross-linked copolymer containing PMS/2EHA (75/25) alone, of ammonium polyphosphate (APP) alone, or of a 60/40 mixture of both (calculated and experimental values).
Figure 4:
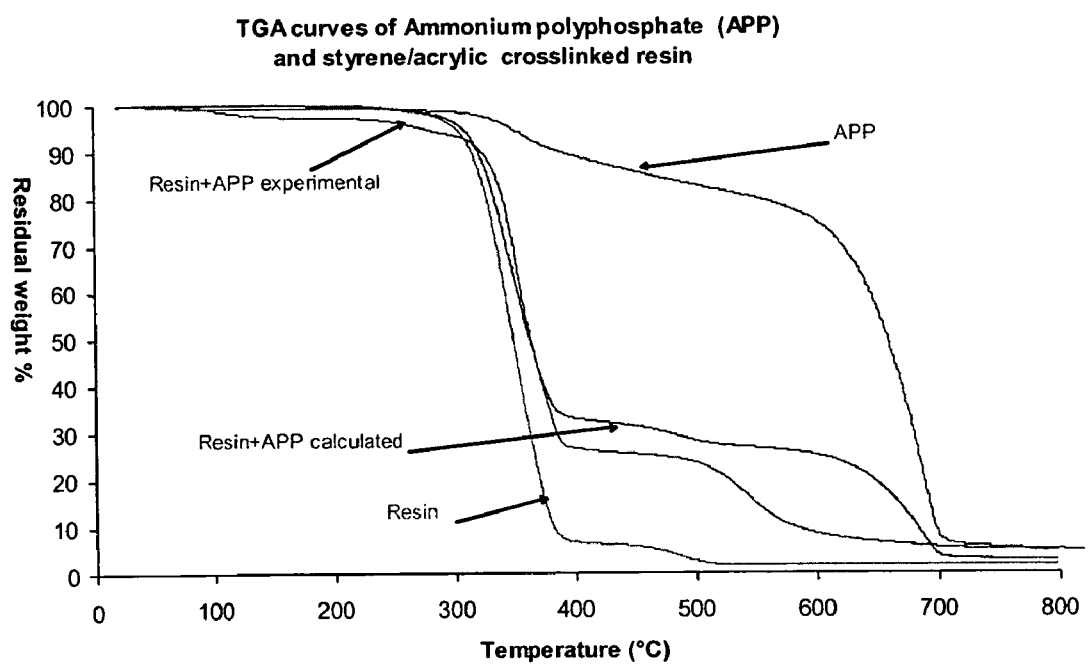
FIG. 4 shows the thermal stability of a copolymer containing a cross-linked styrene/acrylic copolymer alone, of ammonium polyphosphate (APP) alone, or of a 60/40 mixture of both (calculated and experimental values).

Similar results are obtained with the cross-linked copolymers (FIGS. 3 and 4).

Figure 5:
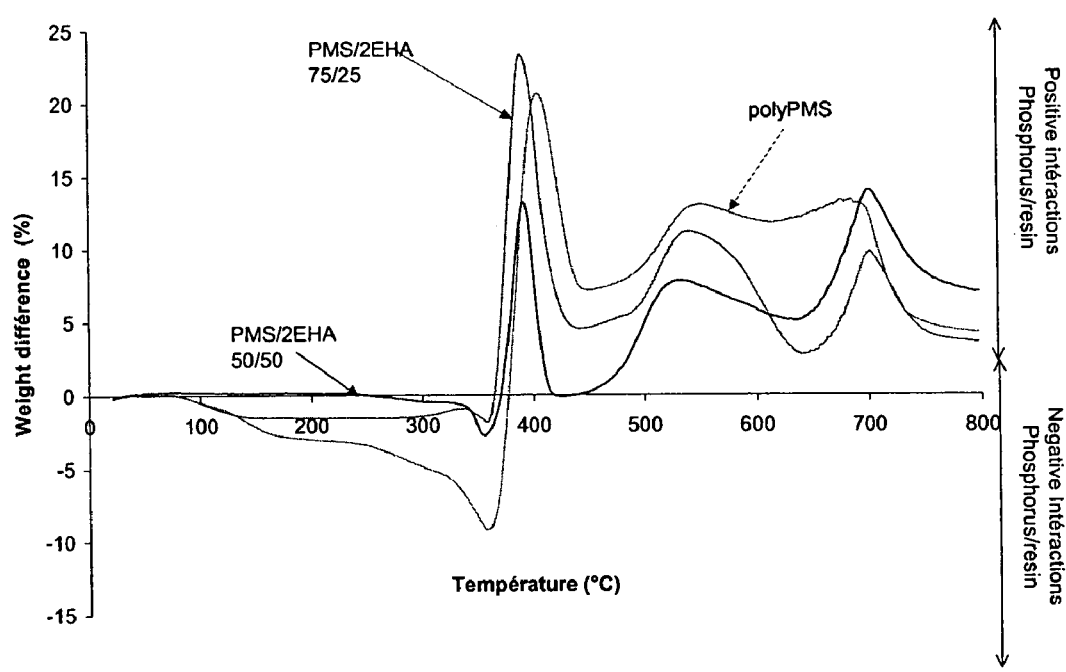
FIG. 5 illustrates the differences between theoretical and experimental weight loss in TGA for 60/40 blends of various PMS/2EHA (50/50, 75/25 and 100/0) copolymers and APP ($\Delta$(T) curves)

The difference between theoretical and experimental weight loss (Δ(T)) curves in FIG. 5 obtained with PMS/2EHA copolymers of various ratios show that the stability increases as the level of substituted styrene (PMS) increases.

EXAMPLE 2

Preparation of Intumescent Paints

Different compositions have been prepared. The first series of paints was prepared without chlorinated paraffin to visualise the effect of the nature of the polymeric binder on the fire performance. The second series of paints were prepared with chlorinated paraffin.

Paints were prepared with a linear polymer PMS/2EHA, cross-linked polymer PMS/2EHA, linear S/A polymer, cross-linked S/A polymer or comparative commercial S/A copolymer.

The copolymers were dissolved under high shear in the solvent, then the chlorinated paraffin was added where necessary and after homogenisation the pigments were dispersed in the order described.

The compositions are illustrated in Table 1.

TABLE 1

| Ingredients | parts |
|---|---|
| Paint with newtonian resin only | |
| Newtonian resin | 4.20 |
| Eastman TXIB | 0.9 |
| Bentone SD1 | 1.02 |
| Tioxide TR92 | 9.18 |
| Melamine | 9.18 |
| Dipentaerythritol | 15.61 |
| Exolit AP422 | 31.33 |
| Solvesso 100 | 28.57 |
| Paint with newtonian & crosslinked resin | |
| Newtonian resin | 3.36 |
| Crosslinked resin | 0.84 |
| Eastman TXIB | 0.9 |
| Bentone SD1 | 1.02 |
| Tioxide TR92 | 9.18 |
| Melamine | 9.18 |
| Dipentaerythritol | 15.61 |
| Exolit AP422 | 31.33 |
| Solvesso 100 | 28.57 |

2.1. Paints Without Chlorinated Paraffin:

Paint A1: Newtonian PMS/2EHA (75/25) copolymer

Paint A2: Newtonian cross-linked PMS/2EHA (75/25) copolymer

Paint B1: Newtonian PMS/2EHA/acrylic copolymer (50/14/36)

Paint B2: Newtonian cross-linked PMS/2EHA/acrylic copolymer (50/14/36)

Paint C1: Newtonian styrene/2EHA/acrylic copolymer (50/14/36)

Paint C2: Newtonian cross-linked styrene/2EHA/acrylic copolymer (50/15/36).

2.2. Paints with Chlorinated Paraffin

The compositions are illustrated in Table 2.

TABLE 2

| Ingredients | parts |
|---|---|
| Paint 1 | |
| Newtonian PMS/2EHA resin | 6.5 |
| Crosslinked PMS/2EHA resin | 2.5 |
| Cereclor S52 | 3.0 |
| Cereclor 70 | 6.5 |
| Tioxide TR92 | 6.0 |
| Dipentaerythritol | 8.0 |
| Melamine | 8.5 |
| Exolit AP422 | 26 |
| white spirit 17 | 23 |
| Solvesso 100 | 10 |
| Paint 2 | |
| Newtonian PMS/2EHA/PTBS resin | 6.36 |
| Crosslinked PMS/2EHA/PTBS resin | 0.71 |
| Cereclor S52 | 2.78 |
| Cereclor 70 | 4.29 |
| Tioxide TR92 | 8.08 |
| Dipentaerythritol | 12.12 |
| Melamine | 13.13 |
| Exolit AP422 | 22.22 |
| white spirit 17 | 30.3 |
| Solvesso 100 | |
| Paint 3 | |
| Newtonian Styrene/acrylic resin | 8.4 |
| Crosslinked styrene/acrylic resin | 2.1 |
| Cereclor 70 | 8.5 |
| Tioxide TR92 | 9.5 |
| Dipentaerythritol | 7.9 |
| Melamine | 7.9 |
| Exolit AP422 | 26.4 |
| white spirit 17 | 26.3 |
| Solvesso 100 | 3.0 |
| comparative Paint 4 | |
| Comparative newtonian Styrene/acrylic resin | 9.0 |
| Cereclor 54DP | 5.76 |
| Cereclor S52 | 3.0 |
| Cereclor 70 | 1.6 |
| Tioxide TR92 | 6.0 |
| Dipentaerythritol | 8.0 |
| Melamine | 8.5 |
| Exolit AP422 | 26.0 |
| white spirit 17 | 19.6 |
| Solvesso 100 | 10.0 |
| Bentonite | 1.0 |

EXAMPLE 3

Evaluation of Thermal Insulation 3.1. Measurements

The temperature profiles are established by measurement of fire resistance with a cone calorimeter. The insulating property of the intumescent coating was tested by measuring the temperature of the coated substrate submitted to a heat flux of 35 or 75 kW/m$^2$. In the procedure utilized, 100× 100×4 mm aluminium panels were coated with the intumescent coatings (800 g/m$^2$) and allowed to dry for 48 hours at 50° C. Samples were exposed to a Stanton Redcroft Cone Calorimeter according to ASTM 1356-90 and ISO 5660 under a heat flux of 35 or 75 kW/m$^2$ (50 kW/m$^2$ corresponds to the heat evolved during a fire: from V. Babrauskas in *Fire and Mat* (1984), 8(2), 81).

The rate of heat release (RHR) represents the evolution of calorific flow versus time for a given sample surface and is measured using oxygen consumption calorimetry. The data (TCO, TCO2, TSV and THR) were computed using a home-developed software.

3.2. Results

Figure 6:
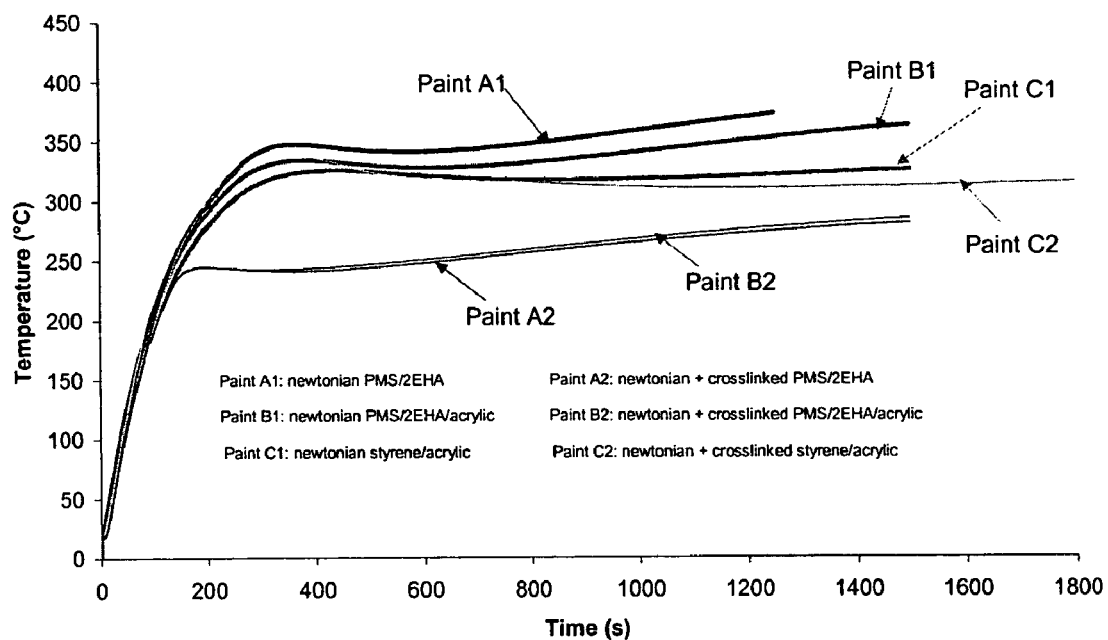
FIG. 6 shows thermal insulation on aluminium plates with intumescent coatings prepared with Newtonian or cross-linked copolymers, said copolymers containing PMS/2EHA (75/25) alone, or PMS/2EHA/acrylic or styrene/acrylic.
Figure 7:
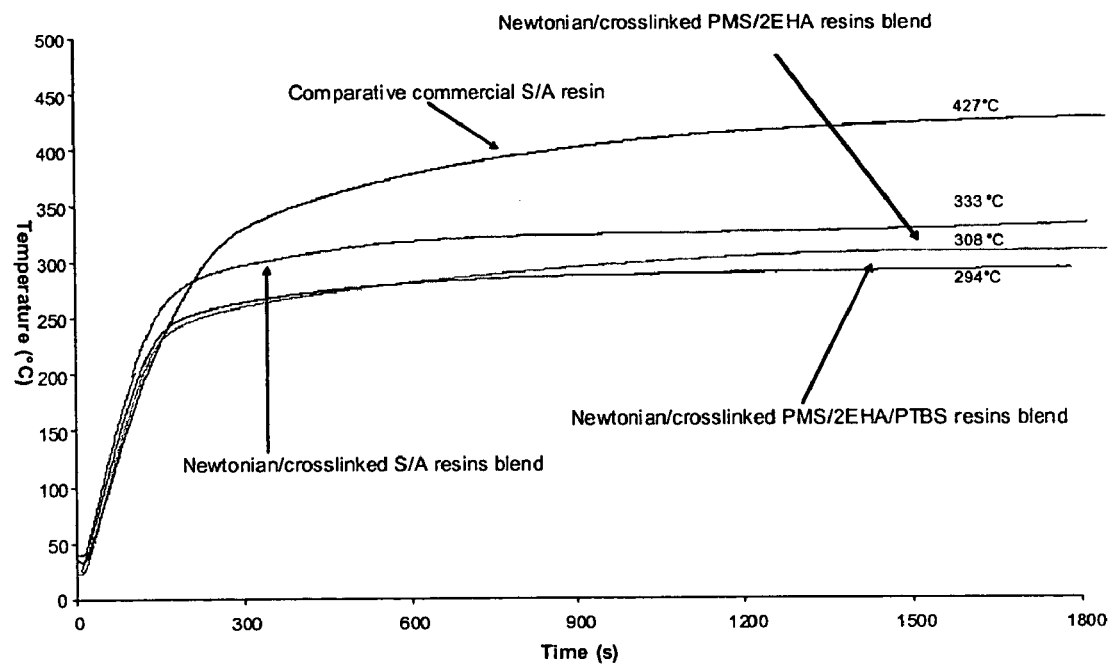
FIG. 7 illustrates thermal insulation on aluminium plates with intumescent coatings prepared with copolymer containing a blend of Newtonian and cross-linked polymers or with a commercial styrene/acrylic copolymer.

They are illustrated in FIGS. 6 and 7.

The graphs in FIG. 6 show that the thermal insulation is better when the binder is composed of a combination of linear and cross-linked polymers (paint A2, B2 and C2). When using this combination of polymer, the temperature measured at the back of the coated plate is significantly lower than with the linear polymer as a sole binder. The coatings are particularly efficient when the polymers are prepared from PMS and 2EHA alone (coating A2) or associated to a further substituted acrylate (B2).

FIG. 7 shows that after 30 minutes exposure at 35 kW/m$^2$, the temperature at the back of the plate remains stabilized at about 310° C. when the coating is prepared with the combination of Newtonian and cross-linked polymers, i.e. about 110° C. below the temperature measured with the comparative S/A binder.

EXAMPLE 4

Fire Performance of the Intumescent Coatings

Figure 8:
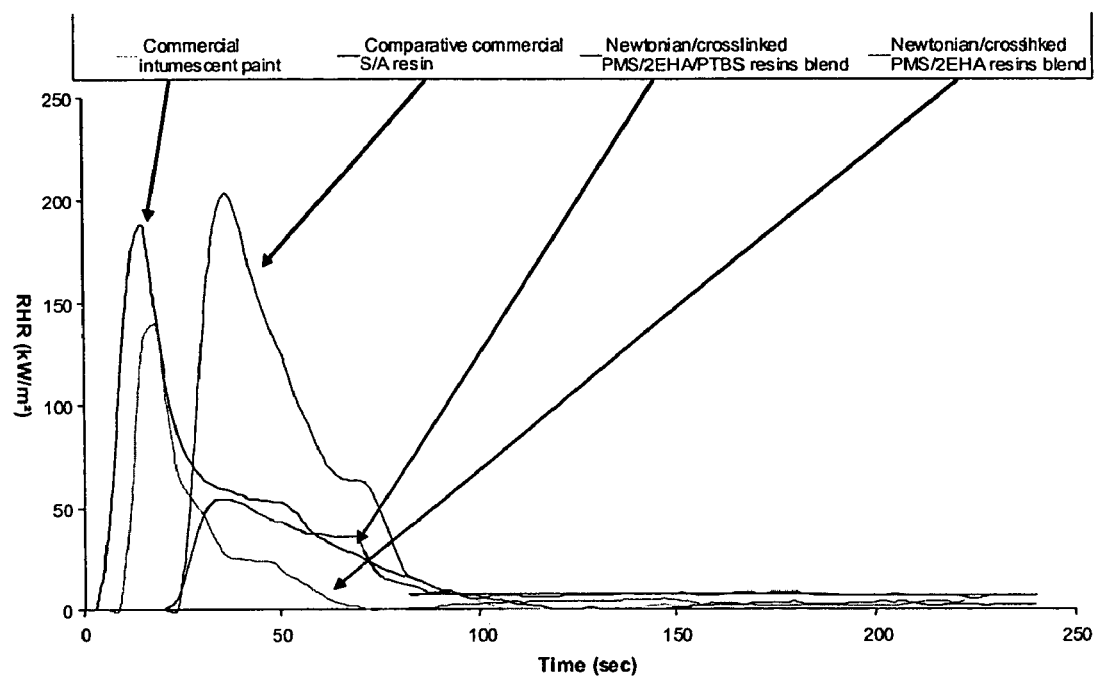
FIG. 8 illustrates the values of Rate of Heat Release (RHR) measured with a cone calorimeter after exposition to 35 kW/m$^2$ of intumescent coatings prepared with coating 1, coating 2 or coating 4 of example 2.

They are measured with paints with chlorinated paraffin and are illustrated in FIG. 8.

All the curves look similar with a first major peak corresponding to the formation of the intumescent structure, followed by a second minor peak or a plateau corresponding to the degradation of the foam and to the formation of a residue, which is stable at high temperature.

The rate of heat release (RHR) is maximal for the composition comprising the comparative commercial styrene/acrylic copolymer (200 kW/m$^2$). It is low for the composition comprising the substituted styrene/2EHA copolymers, respectively 139 kW/m$^2$ for the PMS/2EHA copolymer and 54 kW/m$^2$ for the PMS/PTBS/2EHA copolymer. The RHR obtained with the commercial solvent based paint (Unitherm 38091) was measured for comparison and was determined to be 186 kW/m$^2$.

The smoke volumes, CO and CO$_2$ emission and the total heat release are given in table 2, where the good performance of the substituted styrene/2EHA polymers (paints 1 to 3) as compared to Unitherm 38091.

The low values for smoke, CO and CO$_2$ emissions obtained with the copolymers as binders according to the invention lead to the protection of the environment.

While certain representative embodiments and details have been shown for the purpose of illustrating the subject invention, it will be apparent to those skilled in this art that various changes and modifications can be made therein without departing from the scope of the subject invention.

What is claimed is:

1. A copolymer composition for use in or as a polymeric binder in an intumescent coating, said copolymer composition comprising a blend of a Newtonian copolymer and of a reticulated copolymer, wherein the Newtonian copolymer is comprised of p-methylstyrene repeat units and 2-ethylhexylacrylate repeat units, and wherein the reticulated copolymer is comprised of p-methylstyrene repeat units and 2-ethylhexylacrylate repeat units.

2. A copolymer composition as specified in claim 1 wherein the Newtonian copolymer is further comprised of p-tert-butylstyrene repeat units.

3. A copolymer composition as specified in claim 1 wherein the reticulated copolymer is further comprised of p-tert-butylstyrene repeat units.

4. A copolymer according to claim 1 wherein the reticulated copolymer is a thixotropic copolymers.

5. A copolymer as specified in claim 1 wherein the reticulated copolymer is a pseudo-plastic copolymers.

6. A copolymer according to claim 1 wherein the ratio of p-methylstyrene to 2-ethylhexylacrylate in the reticulated copolymer is within the range of 90/10 to 75/25.

7. A copolymer according to claim 1 wherein the Newtonian copolymer is further comprised of isobutylmethacrylate.

8. A copolymer according to claim 1 wherein the reticulated copolymer is further comprised of isobutylmethacrylate.

9. A copolymer according to claim 1 wherein the Newtonian copolymer is obtained by emulsion polymerisation.

10. A copolymer according to claim 1 wherein the reticulated copolymer is obtained by emulsion polymerisation.

* * * * *